(12) United States Patent
Xie et al.

(10) Patent No.: US 11,536,503 B2
(45) Date of Patent: Dec. 27, 2022

(54) REFRIGERATED CONTAINER REFRIGERATION SYSTEM CAPABLE OF PREVENTING FREEZING OF CONTAINER DOOR

(71) Applicant: Shanghai Ocean University, Shanghai (CN)

(72) Inventors: Jing Xie, Shanghai (CN); Yuyao Sun, Shanghai (CN); Jinfeng Wang, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 22 days.

(21) Appl. No.: 17/344,916

(22) Filed: Jun. 10, 2021

(65) Prior Publication Data

US 2021/0302085 A1    Sep. 30, 2021

(30) Foreign Application Priority Data

Sep. 10, 2020 (CN) .......................... 202010943165.8

(51) Int. Cl.
*F25B 49/02* (2006.01)
*F25B 9/00* (2006.01)
(Continued)

(52) U.S. Cl.
CPC .............. *F25B 49/02* (2013.01); *F25B 9/008* (2013.01); *F25B 9/10* (2013.01); *F25B 25/005* (2013.01);
(Continued)

(58) Field of Classification Search
CPC .. F25B 49/02; F25B 9/008; F25B 9/10; F25B 25/005; F25B 31/00; F25B 43/02;
(Continued)

(56) References Cited

U.S. PATENT DOCUMENTS

2006/0123835 A1* 6/2006 Takegami ............... F25B 13/00
                                                                  62/324.1
2019/0203980 A1* 7/2019 Cavalleri .................. F25B 5/02
(Continued)

FOREIGN PATENT DOCUMENTS

CN    101946135 B    10/2012
CN    111595049 A     8/2020

*Primary Examiner* — Miguel A Diaz

(57) ABSTRACT

This disclosure relates to cold-chain transportation, and more particularly to a refrigerated container refrigeration system capable of preventing freezing of container door, including compressors, oil separators, gas coolers, regenerators, electronic expansion valves, gas-liquid separators, an evaporator, suction pressure regulating valves, oil-level solenoid valves, gas cooler pressure regulating valves, differential pressure regulating valves, an evaporation pressure regulating valve, solenoid valves, check valves, flow meters, pressure sensors, temperature sensors, a door anti-freezing area, a refrigerated container shell, refrigerated container doors, a refrigeration unit, an anti-freezing pipeline and fastening components. Carbon dioxide is selected as refrigerant. A flow two-stage cycle compression refrigeration system with switchable operation pipeline is adopted, and the outlet pipeline of a high-pressure compressor is extended for preventing freezing of container door.

7 Claims, 9 Drawing Sheets

(51) Int. Cl.
  *F25B 9/10* (2006.01)
  *F25B 25/00* (2006.01)
  *F25B 31/00* (2006.01)
  *F25B 43/02* (2006.01)

(52) U.S. Cl.
  CPC .............. *F25B 31/00* (2013.01); *F25B 43/02* (2013.01); *F25B 2500/31* (2013.01); *F25B 2600/2509* (2013.01); *F25B 2600/2513* (2013.01); *F25B 2700/21* (2013.01)

(58) Field of Classification Search
  CPC .......... F25B 2500/31; F25B 2600/2509; F25B 2600/2513; F25B 2700/21; F25B 1/10
  See application file for complete search history.

(56) References Cited

U.S. PATENT DOCUMENTS

| | | | |
|---|---|---|---|
| 2021/0116151 A1* | 4/2021 | Yamawaki | F25B 30/02 |
| 2021/0254864 A1* | 8/2021 | Cavalleri | F25B 41/24 |
| 2021/0356177 A1* | 11/2021 | Kumakura | F25B 7/00 |
| 2022/0034555 A1* | 2/2022 | James | C09K 5/041 |
| 2022/0186988 A1* | 6/2022 | Takegami | F25B 1/10 |

* cited by examiner

REFRIGERATED CONTAINER REFRIGERATION SYSTEM CAPABLE OF PREVENTING FREEZING OF CONTAINER DOOR

CROSS-REFERENCE TO RELATED APPLICATIONS

This application claims the benefit of priority from Chinese Patent Application No. 202010943165.8, filed on Sep. 10, 2020. The content of the aforementioned application, including any intervening amendments thereto, is incorporated herein by reference in its entirety.

TECHNICAL FIELD

This application relates to cold chain transportation, and more particularly to a refrigerated container refrigeration system capable of preventing freezing of a container door.

BACKGROUND

Refrigerated container is commonly used in the cold chain transportation at present, and it can adjust the internal environment to the required temperature range a refrigeration system for the low temperature transportation of frozen and refrigerated food (such as aquatic products) and medical vaccines. The refrigerated container can be used for both sea and land transportation, which greatly expands the application range of the cold chain transportation.

During transportation, the internal temperature of the refrigerated container is generally kept at −18° C. or lower, so that the door, especially the area where the edge of the door is in contact with the container body, is prone to freezing after the long-term refrigeration process. After frozen, the door will be more difficult to open and close for the operator, and a breeding area for bacteria will be created. Therefore, the anti-freezing treatment on the door plays an important role in effectively improving the cold chain transportation efficiency of refrigerated containers.

It has been theoretically analyzed by Luca Cecchinato, et al. based on various refrigeration systems using carbon dioxide as a refrigerant that the COP (coefficient of performance) value of the split two-stage compression cycle refrigeration system is higher than that of the carbon dioxide refrigeration systems such as ordinary two-stage compression refrigeration system and auxiliary compression cycle refrigeration system. Carbon dioxide is a non-metallic, non-volatile, non-toxic and harmless gas, and will not harm the ozone layer. As a consequence, the use of carbon dioxide as the refrigerant can effectively avoid the damage to the ozone layer, protecting the environment.

Given the above, the use of carbon dioxide refrigeration system on the refrigerated container can effectively protect the environment, especially for the ozone layer. Moreover, the heat of the high-temperature pipeline in the refrigeration system can be applied to the anti-freezing of the door, so that there is no need to install an additional antifreeze device such as heating wire, simplifying the structure and improving the energy utilization rate of the high-temperature pipeline.

SUMMARY

An object of this application is to provide a refrigerated container refrigeration system capable of preventing freezing of a container door, in which the high-temperature pipeline of the refrigeration system is extended to surround the edge of the container door along the bottom edge of the refrigerated container, and when the high-temperature refrigerant in the high-temperature pipeline passes through the door, the heat will be transferred to prevent the refrigerated container door from freezing.

To achieve the above object, this application provides a refrigerated container refrigeration system capable of preventing freezing of a container door, comprising:
  compressors;
  oil separators;
  gas coolers;
  regenerators;
  electronic expansion valves;
  gas-liquid separators;
  an evaporator;
  suction pressure regulating valves;
  oil level solenoid valves;
  gas cooler pressure regulating valves;
  differential pressure regulating valves;
  an evaporation pressure regulating valve;
  solenoid valves;
  check valves;
  flow meters;
  pressure sensors;
  temperature sensors;
  a door anti-freezing area;
  a refrigerated container shell;
  refrigerated container doors;
  a refrigeration unit;
  an anti-freezing pipeline; and
  fastening components;
  wherein the compressors comprise a low-pressure compressor and a high-pressure compressor;
  the oil separators comprise a first oil separator and a second oil separator;
  the gas coolers comprise a first gas cooler and a second gas cooler;
  the regenerators comprise a first regenerator and a second regenerator;
  the electronic expansion valves comprise a first electronic expansion valve and a second electronic expansion valve;
  the gas-liquid separators comprise a first gas-liquid separator and a second gas-liquid separator;
  the suction pressure regulating valves comprise a first suction pressure regulating valve and a second suction pressure regulating valve;
  the oil level solenoid valves comprise a first oil level solenoid valve and a second oil level solenoid valve;
  the gas cooler pressure regulating valves comprise a first gas cooler pressure regulating valve and a second gas cooler pressure regulating valve;
  the differential pressure regulating valves comprise a first differential pressure regulating valve and a second differential pressure regulating valve;
  the solenoid valves comprise a first solenoid valve, a second solenoid valve, a third solenoid valve, a fourth solenoid valve, a fifth solenoid valve and a sixth solenoid valve;
  the check valves comprise a first check valve, a second check valve and a third check valve;
  the flow meters comprise a first flow meter and a second flow meter;
  the pressure sensors comprise a first pressure sensor, a second pressure sensor, a third pressure sensor, a fourth pressure sensor, a fifth pressure sensor, a sixth pressure sensor, a seventh pressure sensor, an eighth pressure sensor, a ninth pressure sensor, a tenth pressure sensor, an eleventh pressure sensor and a twelfth pressure sensor;

the temperature sensors comprise a first temperature sensor, a second temperature sensor, a third temperature sensor, a fourth temperature sensor, a fifth temperature sensor, and a sixth temperature sensor, a seventh temperature sensor, an eighth temperature sensor, a ninth temperature sensor, a tenth temperature sensor, an eleventh temperature sensor and a twelfth temperature sensor;

the refrigerated container doors comprise a first refrigerated container door and a second refrigerated container door;

the fastening components comprise a first fastening component, a second fastening component, a third fastening component, a fourth fastening component, a fifth fastening component and a sixth fastening component;

an outlet of the low-pressure compressor is connected to the first oil separator;

a gas outlet of the first oil separator is connected to an inlet of the first gas cooler;

pipelines of an outlet of the first gas cooler and an outlet of the first gas-liquid separator converge and are connected to an inlet of the high-pressure compressor together;

an outlet of the high-pressure compressor is connected to the second oil separator;

a pipeline of a gas outlet of the second oil separator passes through the door anti-freezing area, and is connected to an inlet of the second gas cooler; a pipeline that does not pass through the door anti-freezing area is provided in parallel in the pipeline of the gas outlet of the second oil separator;

a pipeline of an outlet of the second gas cooler is divided into a first branch pipeline and a second branch pipeline, which are connected to a low-temperature end inlet and a high-temperature end inlet of the first regenerator, respectively; the first branch pipeline is connected to the first electronic expansion valve, and then connected to the low-temperature end inlet of the first regenerator; the second branch pipeline is directly connected to the high temperature end inlet of the first regenerator;

the first branch pipeline passes through the first regenerator and is connected to the first gas-liquid separator; the second branch pipeline passes through the first regenerator and is connected to a high-temperature end inlet of the second regenerator; a pipeline connected to the high-temperature end inlet of the second regenerator without passing through the first regenerator is provided beside the second branch pipeline and in parallel with the second branch pipeline;

a low-temperature end outlet of the second regenerator is connected to the second electronic expansion valve;

the second electronic expansion valve is connected to an inlet of the evaporator;

an outlet of the evaporator is connected to the second gas-liquid separator;

a gas outlet of the second gas-liquid separator is connected to a low-temperature end inlet of the second regenerator;

a high-temperature end outlet of the second regenerator is connected to the low-pressure compressor;

the first suction pressure regulating valve and the second suction pressure regulating valve are arranged on pipelines at front of the low-pressure compressor and the high-pressure compressor, respectively;

a first parallel pipeline is connected between the first oil separator and the low-pressure compressor; a second parallel pipeline is connected between the second oil separator and the high-pressure compressor;

the first oil level solenoid valve and the second oil level solenoid valve are respectively arranged on the first and second parallel pipelines;

the first gas cooler pressure regulating valve and the second gas cooler pressure regulating valve are respectively arranged on pipelines behind the first gas cooler and the second gas cooler; and a third parallel pipeline is arranged beside the pipeline at front of the first gas cooler; a fourth parallel pipeline is arranged beside the pipeline at front of the second gas cooler; the first differential pressure regulating valve and the second differential pressure regulating valve are arranged the third parallel pipeline and the fourth parallel pipeline, respectively;

the solenoid valve is configured for pipeline switching;

the check valve is configured to prevent pipeline refilling;

the evaporation pressure regulating valve is arranged at the outlet of the evaporator;

the first flow meter and the second flow meter are respectively arranged at the outlet of the second gas cooler and the low-temperature end outlet of the second regenerator;

the first pressure sensor and the first temperature sensor constitute a first temperature-pressure monitoring group;

the second pressure sensor and the second temperature sensor constitute a second temperature-pressure monitoring group;

the third pressure sensor and the third temperature sensor constitute a third temperature-pressure monitoring group;

the fourth pressure sensor and the fourth temperature sensor constitute a fourth temperature-pressure monitoring group;

the fifth pressure sensor and the fifth temperature sensor constitute a fifth temperature-pressure monitoring group;

the sixth pressure sensor and the sixth temperature sensor constitute a sixth temperature-pressure monitoring group;

the seventh pressure sensor and the seventh temperature sensor constitute a seventh temperature-pressure monitoring group;

the eighth pressure sensor and the eighth temperature sensor constitute an eighth temperature-pressure monitoring group;

the ninth pressure sensor and the ninth temperature sensor constitute a ninth temperature-pressure monitoring group;

the tenth pressure sensor and the tenth temperature sensor constitute a tenth temperature-pressure monitoring group;

the eleventh pressure sensor and the eleventh temperature sensor constitute an eleventh temperature-pressure monitoring group;

the twelfth pressure sensor and the twelfth temperature sensor constitute a twelfth temperature-pressure monitoring group;

the first temperature-pressure monitoring group is provided at the pipeline at front of the low-pressure compressor and is provided between the low-pressure compressor and the first suction pressure regulating valve; the second temperature-pressure monitoring group is provided at a pipeline connected between the first oil separator and the first gas cooler; the third temperature-pressure monitoring group is provided at a pipeline connected between the first gas cooler pressure regulating valve and the first check valve; the fourth temperature-pressure monitoring group is provided at the pipeline at front of the high-pressure compressor and is provided between the high-pressure compressor and the second suction pressure regulating valve; the fifth temperature-pressure monitoring group is provided at a pipeline connected between the second oil separator and the fifth solenoid valve; the sixth temperature-pressure monitoring group is provided at a pipeline connected between the second gas cooler pressure regulating valve and the first flow meter; the seventh temperature-pressure monitoring group is provided at a pipeline connected between the first electronic expansion valve and the low-temperature end inlet of the first regenerator; the eighth temperature-pressure monitoring group is provided at a pipeline connected between the first gas-liquid separator and the second check valve; the ninth temperature-pressure monitoring group is provided at a pipeline at front of the high-temperature end inlet of the second regenerator; the tenth temperature-pressure monitoring group is provided at a pipeline connected between the low-temperature end outlet of the second regenerator and the second flow meter; the eleventh temperature-pressure monitoring group is provided at a pipeline connected between the second electronic expansion valve and the inlet of the evaporator; the twelfth temperature-pressure monitoring group is provided at a pipeline connected between the gas outlet of the second gas-liquid separator and the low-temperature end inlet of the second regenerator;

the anti-freezing pipeline extends from the refrigeration unit, and is arranged along an inner edge of the refrigerated container shell, and clockwise around the first refrigerated container door and the second refrigerated container door for one circle, and then back to the refrigeration unit along the inner edge of the refrigerated container shell; and the first fastening component, the second fastening component, the third fastening component, the fourth fastening component, the fifth fastening component and the sixth fastening component are configured to fix the anti-freezing pipeline.

In some embodiments, a refrigerant of the refrigeration system is carbon dioxide.

In some embodiments, the refrigeration system is a refrigeration system with a switchable operation pipeline, and is configured to be switched between a split two-stage compression cycle refrigeration system and an ordinary two-stage compression refrigeration circulation.

In some embodiments, the solenoid valve of the refrigeration system is switched on and off according to a preset condition; when a main refrigeration system is operated, the first solenoid valve and the second solenoid valve are switched on, and the third solenoid valve is switched off; when a backup refrigeration system is required to be operated, the first solenoid valve and the second solenoid valve are switched off, and the third solenoid valve is switched on; when a pipeline in the door anti-freezing area is in a normal state, the fourth solenoid valve and the sixth solenoid valve are switched on, and the fifth solenoid valve is switched off; when the pipeline in the door anti-freezing area is in a fault state, the fourth solenoid valve and the sixth solenoid valve are switched off, and the fifth solenoid valve is switched on.

In some embodiments, the refrigerated container shell has a three-layer structure; wherein an outer layer and an inner layer of the refrigerated container shell are made of stainless steel, and a middle layer of the refrigerated container shell is an insulation layer made of a vacuum insulation board or a polyurethane board.

In some embodiments, 10-20 cm of the anti-freezing pipeline is reserved as an elastic margin.

In some embodiments, the fastening component is made of stainless steel.

Compared to the prior art, this application has the following beneficial effects.

In the refrigerated container refrigeration system provided herein, the high-temperature pipeline is extended to surround the edge of the refrigerated container door to prevent the door from freezing. Carbon dioxide is selected as refrigerant, which is non-metallic, non-volatile, non-toxic and harmless, and will not harm the ozone layer. The refrigeration system adopts a split two-stage compression cycle refrigeration system with a high COP value, and the refrigeration system can be switched to an ordinary two-stage compression refrigeration system by controlling the on and off of the solenoid valve, or the pipeline can be switched to avoid the failure of the anti-freezing pipeline. This application provides a new idea for the anti-freezing design of the refrigerated container door.

Figure 1:
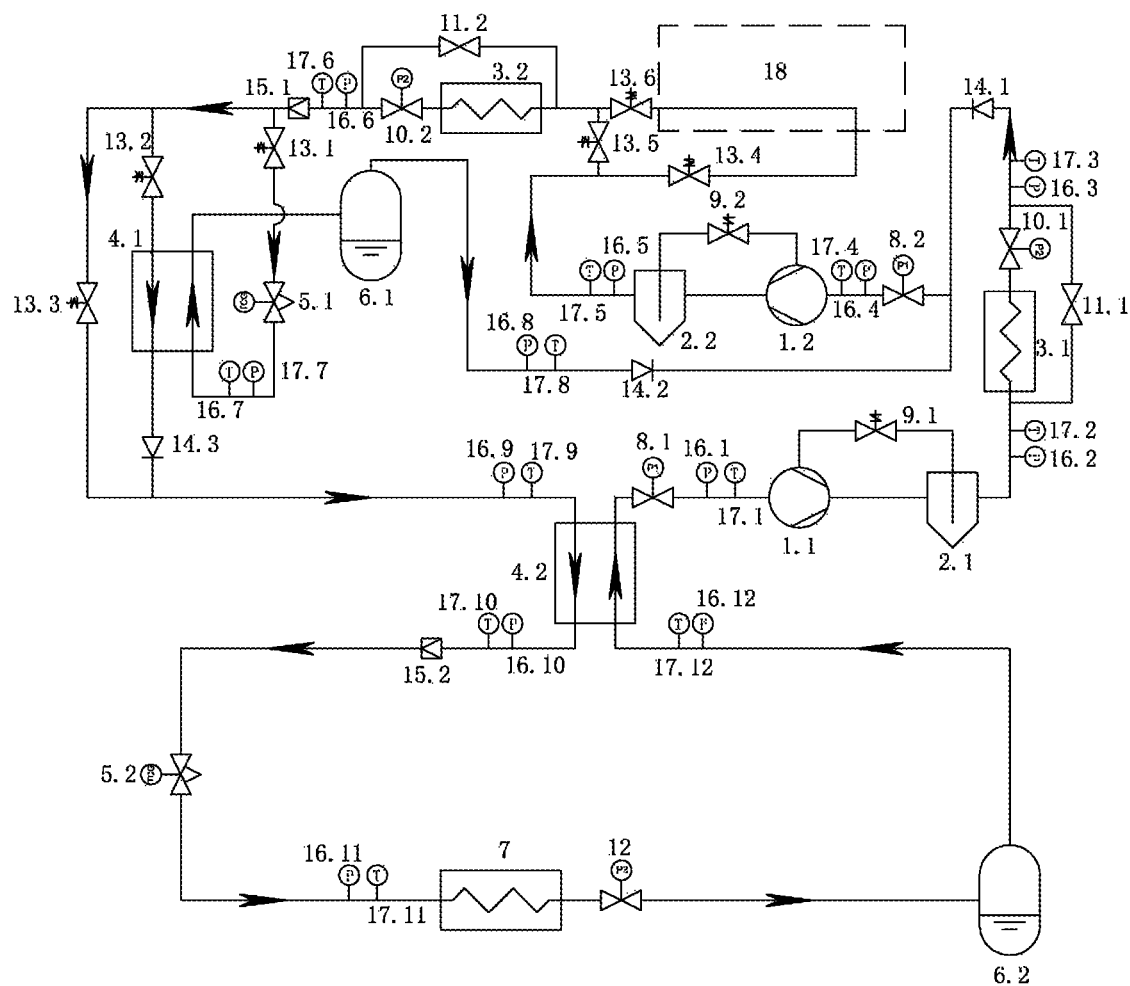
FIG. 1 is a schematic diagram of a refrigerated container refrigeration system capable of preventing freezing of container door according to an embodiment of the disclosure.

In the drawings, 1.1, low-pressure compressor; 1.2, high-pressure compressor; 2.1, first oil separator; 2.2, second oil separator; 3.1, first gas cooler; 3.2, second gas cooler; 4.1, first regenerator; 4.2, second regenerator; 5.1, first electronic expansion valve; 5.2, second electronic expansion valve; 6.1, first gas-liquid separator; 6.2, second gas-liquid separator; 7, evaporator; 8.1, first suction pressure regulating valve; 8.2, second suction pressure regulating valve; 9.1, first oil level solenoid valve; 9.2, second oil level solenoid valve; 10.1, first gas cooler pressure regulating valve; 10.2, second gas cooler pressure regulating valve; 11.1, first differential pressure regulating valve; 11.2, second differential pressure regulating valve; 12, evaporation pressure regulating valve; 13.1, first solenoid valve; 13.2, second solenoid valve; 13.3, third solenoid valve; 13.4, fourth solenoid valve; 13.5, fifth solenoid valve; 13.6, sixth solenoid valve; 14.1, first check valve; 14.2, second check valve; 14.3, third check valve; 15.1, first flow meter; 15.2, second flow meter;

16.1, first pressure sensor; 16.2, second pressure sensor; 16.3, third pressure sensor; 16.4, fourth pressure sensor; 16.5, fifth pressure sensor; 16.6, sixth pressure sensor; 16.7, seventh pressure sensor; 16.8, eighth pressure sensor; 16.9, ninth pressure sensor; 16.10, tenth pressure sensor; 16.11, eleventh pressure sensor; 16.12, twelfth pressure sensor; 17.1, first temperature sensor; 17.2, second temperature sensor; 17.3, third temperature sensor; 17.4, fourth temperature sensor; 17.5, fifth temperature sensor; 17.6, sixth temperature sensor; 17.7, seventh temperature sensor; 17.8, eighth temperature sensor; 17.9, ninth temperature sensor; 17.10, tenth temperature sensor; 17.11, eleventh temperature sensor; 17.12, twelfth temperature sensor; 18, door anti-freezing area; 19, refrigerated container shell; 20.1, first refrigerated container door; 20.2, second refrigerated container door, 21, refrigeration unit; 22, anti-freezing pipeline; 23.1, first fastening component; 23.2, second fastening component; 23.3, third fastening component; 23.4, fourth fastening component; 23.5, fifth fastening component; and 23.6, sixth fastening component.

DETAILED DESCRIPTION OF EMBODIMENTS

The disclosure will be further described below in detail with reference to the accompanying drawings and the embodiments.

The refrigerated container shell has a size of 1.2×1.2×1.2 m, and a wall thickness of 80 mm.

Referring to an embodiment shown in FIG. 1, a refrigerated container refrigeration system capable of preventing freezing of container door includes a low pressure compressor 1.1, a high-pressure compressor 1.2, a first oil separator 2.1, a second oil separator 2.2, a first gas cooler 3.1, a second gas cooler 3.2, a first regenerator 4.1, a second regenerator 4.2, a first electronic expansion valve 5.1, a second electronic expansion valve 5.2, a first gas-liquid separator 6.1, a second gas-liquid separator 6.2, a evaporator 7, a first suction pressure regulating valve 8.1, a second suction pressure regulating valve 8.2, a first oil level solenoid valve 9.1, a second oil level solenoid valve 9.2, a first gas cooler pressure regulating valve 10.1, a second gas cooler pressure regulating valve 10.2, a first differential pressure regulating valve 11.1, a second differential pressure regulating valve 11.2, a evaporation pressure regulating valve 12, a first solenoid valve 13.1, a second solenoid valve 13.2, a third solenoid valve 13.3, a fourth solenoid valve 13.4, a fifth solenoid valve 13.5, a sixth solenoid valve 13.6, a first check valve 14.1, a second check valve 14.2, a third check valve 14.3, a first flow meter 15.1, a second flow meter 15.2, a first pressure sensor 16.1, a second pressure sensor 16.2, a third pressure sensor 16.3, a fourth pressure sensor 16.4, a fifth pressure sensor 16.5, a sixth pressure sensor 16.6, a seventh pressure sensor 16.7, an eighth pressure sensor 16.8, a ninth pressure sensor 16.9, a tenth pressure sensor 16.10, an eleventh pressure sensor 16.11, a twelfth pressure sensor 16.12, a first temperature sensor 17.1, a second temperature sensor 17.2, a third temperature sensor 17.3, a fourth temperature sensor 17.4, a fifth temperature sensor 17.5, a sixth temperature sensor 17.6, a seventh temperature sensor 17.7, an eighth temperature sensor 17.8, a ninth temperature sensor 17.9, a tenth temperature sensor 17.10, an eleventh temperature sensor 17.11, a twelfth temperature sensor 17.12, and a door anti-freezing area 18.

The first pressure sensor 16.1 and the first temperature sensor 17.1 constitute a first temperature-pressure monitoring group;

the second pressure sensor 16.2 and the second temperature sensor 17.2 constitute a second temperature-pressure monitoring group;

the third pressure sensor 16.3 and the third temperature sensor 17.3 constitute a third temperature-pressure monitoring group;

the fourth pressure sensor 16.4 and the fourth temperature sensor 17.4 constitute a fourth temperature-pressure monitoring group;

the fifth pressure sensor 16.5 and the fifth temperature sensor 17.5 constitute a fifth temperature-pressure monitoring group;

the sixth pressure sensor 16.6 and the sixth temperature sensor 17.6 constitute a sixth temperature-pressure monitoring group;

the seventh pressure sensor 16.7 and the seventh temperature sensor 17.7 constitute a seventh temperature-pressure monitoring group;

the eighth pressure sensor 16.8 and the eighth temperature sensor 17.8 constitute an eighth temperature-pressure monitoring group;

the ninth pressure sensor 16.9 and the ninth temperature sensor 17.9 constitute a ninth temperature-pressure monitoring group;

the tenth pressure sensor 16.10 and the tenth temperature sensor 17.10 constitute a tenth temperature-pressure monitoring group;

the eleventh pressure sensor 16.11 and the eleventh temperature sensor 17.11 constitute an eleventh temperature-pressure monitoring group;

the twelfth pressure sensor 16.12 and the twelfth temperature sensor 17.12 constitute a twelfth temperature-pressure monitoring group.

In the refrigeration system of this application, an outlet of the low-pressure compressor 1.1 is connected to the first oil separator 2.1. A gas outlet of the first oil separator 2.1 is connected to an inlet of the first gas cooler 3.1. Pipelines of an outlet of the first gas cooler 3.1 and an outlet of the first gas-liquid separator 6.1 converge and are connected to an inlet of the high-pressure compressor 1.2 together.

An outlet of the high-pressure compressor 1.2 is connected to the second oil separator 2.2. A pipeline of a gas outlet of the second oil separator 2.2 passes through the door anti-freezing area 18, and is connected to an inlet of the second gas cooler 3.2; a pipeline that does not pass through the door anti-freezing area 18 is provided in parallel in the pipeline of the gas outlet of the second oil separator 2.2.

A pipeline of an outlet of the second gas cooler 3.2 is divided into a first branch pipeline and a second branch pipeline, which are connected to a low-temperature end inlet and a high-temperature end inlet of the first regenerator 4.1, respectively. The first branch pipeline is connected to the first electronic expansion valve 5.1, and then connected to the low-temperature end inlet of the first regenerator 4.1. The second branch pipeline is directly connected to the high temperature end inlet of the first regenerator 4.1. The first branch pipeline passes through the first regenerator 4.1 and is connected to the first gas-liquid separator 6.1. The second branch pipeline passes through the first regenerator 4.1 and is connected to a high-temperature end inlet of the second regenerator 4.2. A pipeline connected to the high-temperature end inlet of the second regenerator 4.2 without passing through the first regenerator 4.1 is provided beside the second branch pipeline and in parallel with the second branch pipeline. A low-temperature end outlet of the second regenerator 4.2 is connected to the second electronic expansion valve 5.2. The second electronic expansion valve 5.2 is connected to an inlet of the evaporator 7. An outlet of the evaporator 7 is connected to the second gas-liquid separator 6.2. A gas outlet of the second gas-liquid separator 6.2 is connected to a low-temperature end inlet of the second regenerator 4.2. A high-temperature end outlet of the second regenerator 4.2 is connected to the low-pressure compressor 1.1.

In the control system of the refrigeration system, the first suction pressure regulating valve 8.1 is arranged on a pipeline at front of the low-pressure compressor 1.1, and the second suction pressure regulating valve 8.2 is arranged on a pipeline at front of the high-pressure compressor 1.2. A first parallel pipeline is connected between the first oil separator 2.1 and the low-pressure compressor 1.1. A second parallel pipeline is connected between the second oil separator 2.2 and the high-pressure compressor 1.2. The first oil level solenoid valve 9.1 is arranged on the first parallel pipeline. The second oil level solenoid valve 9.2 is arranged on the second parallel pipeline.

The first gas cooler pressure regulating valve 10.1 is arranged on a pipeline at front of the first gas cooler 3.1, and the second gas cooler pressure regulating valve 10.2 is arranged on a pipeline at front of the second gas cooler 3.2. A third parallel pipeline is arranged beside the pipeline at front of the first gas cooler 3.1; a fourth parallel pipeline is arranged beside the pipeline at front of the second gas cooler 3.2. The first differential pressure regulating valve 11.1 and the second differential pressure regulating valve 11.2 are arranged the third parallel pipeline and the fourth parallel pipeline, respectively.

The first solenoid valve 13.1 is arranged on a pipeline at front of the first electronic expansion valve 5.1, and the second solenoid valve 13.2 is arranged on a pipeline at front of the high-temperature end inlet of the first regenerator 4.1. The third solenoid valve 13.3 is arranged on a pipeline parallel to the first regenerator 4.1. The fourth solenoid valve 13.4, the fifth solenoid valve 13.5 and the sixth solenoid valve 13.6 are arranged on the pipeline between the second oil separator 2.2 and the second gas cooler 3.2. The evaporation pressure regulating valve 12 is arranged on a pipeline at the outlet of the evaporator 7. The first check valve 14.1 is arranged on the pipeline at the outlet of the first gas cooler 3.1. The second check valve 14.2 is arranged on the pipeline at the gas outlet of the first gas-liquid separator 6.1. The third check valve 14.3 is arranged on the pipeline at the low-temperature end outlet of the first regenerator 4.1.

In the monitor equipment of the refrigeration system, the first flow meter 15.1 is arranged on the pipeline at the outlet of the second gas cooler 3.2 (before the flow split). The second flow meter 15.2 is arranged on the pipeline at the low-temperature end outlet of the second regenerator 4.2. The first temperature-pressure monitoring group is provided at the pipeline of the inlet of the low-pressure compressor 1.1. The second temperature-pressure monitoring group is provided at the pipeline of the inlet of the first gas cooler 3.1, and the third temperature-pressure monitoring group is provided at the pipeline of the outlet of the first gas cooler 3.1. The fourth temperature-pressure monitoring group is provided at the pipeline at front of the high-pressure compressor 1.2. The fifth temperature-pressure monitoring group is provided at the pipeline at the gas outlet of the second oil separator 2.2. The sixth temperature-pressure monitoring group is provided at the pipeline at the outlet of the second gas cooler (before the flow split). The seventh temperature-pressure monitoring group is provided at the pipeline at rear of the first electronic expansion valve 5.1. The eighth temperature-pressure monitoring group is provided at the pipeline at the gas outlet of the first gas-liquid separator 6.1. The ninth temperature-pressure monitoring group is provided at the pipeline at the high-temperature end inlet of the second regenerator 4.2. The tenth temperature-pressure monitoring group is provided at the pipeline at the low-temperature end outlet of the second regenerator 4.2. The eleventh temperature-pressure monitoring group is provided at the pipeline at the inlet of the evaporator 7. The twelfth temperature-pressure monitoring group is provided at the pipeline at the high-temperature end outlet of the second regenerator 4.2.

Carbon dioxide is selected as refrigerant, which is a non-metallic, non-volatile, non-toxic and harmless gas. As a consequence, the use of carbon dioxide as the refrigerant can effectively avoid the damage to the ozone layer, protecting the environment. The direction of the refrigerant in the refrigeration system is shown by the arrow in FIG. 1.

The first oil separator 2.1 de-oils the carbon dioxide leaving the low-pressure compressor 1.1 to remove the lubricating oil carried from the low-pressure compressor 1.1 to prevent the lubricating oil from entering the first gas cooler 3.1. The second oil separator 2.2 de-oils the carbon dioxide leaving the high-pressure compressor 1.2 to remove the lubricating oil carried from the high-pressure compressor 1.2 to prevent the lubricating oil from entering the second gas cooler 3.2.

The first gas-liquid separator 6.1 dehydrates the carbon dioxide leaving the first regenerator 4.1 to remove the moisture in the carbon dioxide, ensuring that the carbon dioxide sent to the high-pressure compressor 1.2 is gaseous carbon dioxide without moisture. The gas-liquid separator 6.2 dehydrates the carbon dioxide leaving the evaporator 7 to remove the moisture in the carbon dioxide, ensuring that the carbon dioxide sent to the second regenerator 4.2 is gaseous carbon dioxide without moisture.

The first suction pressure regulating valve 8.1 regulates the pressure of carbon dioxide before entering the low-pressure compressor 1.1, and the second suction pressure regulating valve 8.2 regulates the pressure of carbon dioxide before entering the high-pressure compressor 1.2.

The first oil level solenoid valve 9.1 regulates the oil level of the first oil separator 2.1 and the lubrication of the low-pressure compressor 1.1, and the second oil level solenoid valve 9.2 regulates the oil level of the second oil separator 2.2 and the lubrication of the high-pressure compressor 1.2.

The first gas cooler pressure regulating valve 10.1 and the first differential pressure regulating valve 11.1 regulate the pressure of carbon dioxide at the outlet of the first gas cooler 3.1. The second gas cooler pressure regulating valve 10.2 and the second differential pressure regulating valve 11.2 regulate the pressure of carbon dioxide at the outlet of the second gas cooler 3.2.

The evaporation pressure regulating valve 12 regulates the pressure of carbon dioxide at the outlet of the evaporator 7.

The refrigeration system is a refrigeration system with a switchable operating pipeline, and the main refrigeration system is a split two-stage compression cycle refrigeration system. When the main refrigeration system is operated, the first solenoid valve 13.1 and the second solenoid valve 13.2 are switched on, and the third solenoid valve 13.3 is switched off. If the pipeline controlled by the first solenoid valve 13.1 suffers from failure, the first solenoid valve 13.1 and the second solenoid valve 13.2 are switched off and the third solenoid valve 13.3 is switched on, such that the system is switched to an ordinary two-stage compression refrigeration system. The ordinary two-stage compression refrigeration system is a backup refrigeration system, of which the COP value is lower than the split two-stage compression cycle refrigeration system. The fourth solenoid valve 13.4, the fifth solenoid valve 13.5 and the sixth solenoid valve 13.6 are configured to control whether the pipeline passes through the door anti-freezing area 18. If it is required to perform anti-freezing treatment on the door, the fourth solenoid valve 13.4 and the sixth solenoid valve 13.6 are switched on, and the fifth solenoid valve 13.5 is switched off. If the pipeline at the door anti-freezing area 18 suffers a fault, the fourth solenoid valve 13.4 and the sixth solenoid valve 13.6 are switched off, and the fifth solenoid valve 13.5 is switched on, so that carbon dioxide does not pass through the door anti-freezing area 18, thereby enabling the normal operation of the refrigeration system.

The first check valve 14.1, the second check valve 14.2 and the third check valve 14.3 are configured to avoid refrigerant recharge.

The first flow meter 15.1 and the second flow meter 15.2 measure the flow at the measuring point. The first temperature-pressure monitoring group, the second temperature-pressure monitoring group, the third temperature-pressure monitoring group, the fourth temperature-pressure monitoring group, the fifth temperature-pressure monitoring group, the sixth temperature-pressure monitoring group, the seventh temperature-pressure monitoring group, the eighth temperature-pressure monitoring group, the ninth temperature-pressure monitoring group, the tenth temperature-pressure monitoring group, the eleventh temperature-pressure monitoring group and the twelfth temperature-pressure monitoring group measure the pressure and temperature of the measuring point. The measured values are transmitted to the remote monitoring center to ensure that the pipeline can be switched in time or the operation of the refrigeration unit can be stopped when there is a huge error in the relevant data.

The door anti-freezing area 18 is a position where the door anti-freezing treatment is performed through a high-temperature pipeline.

Figure 2:
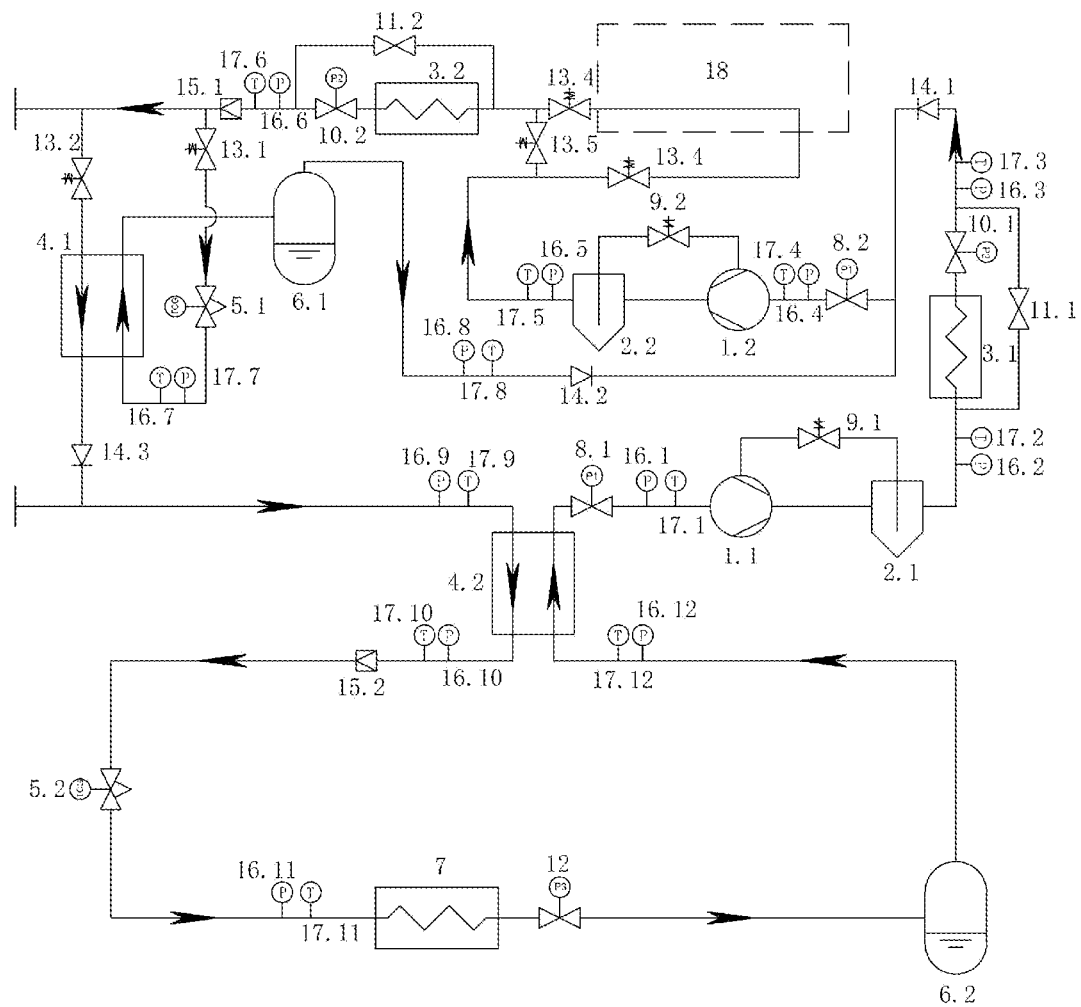
FIG. 2 is a schematic diagram of a main refrigeration system of the refrigerated container refrigeration system capable of preventing freezing of container door according to an embodiment of the disclosure.

Referring to an embodiment shown in FIG. 2, a main refrigeration system of a refrigerated container refrigeration system capable of preventing freezing of container door includes a low-pressure compressor 1.1, a high-pressure compressor 1.2, a first oil separator 2.1, a second oil separator 2.2, a first gas cooler 3.1, a second gas cooler 3.2, a first regenerator 4.1, a second regenerator 4.2, a first electronic expansion valve 5.1, a second electronic expansion valve 5.2, a first gas-liquid separator 6.1, a second gas-liquid separator 6.2, an evaporator 7, a first suction pressure regulating valve 8.1, a second suction pressure regulating valve 8.2, a first oil level solenoid valve 9.1, a second oil level solenoid valve 9.2, a first gas cooler pressure regulating valve 10.1, a second gas cooler pressure regulating valve 10.2, a first differential pressure regulating valve 11.1, a second differential pressure regulating valve 11.2, an evaporation pressure regulating valve 12, a first solenoid valve 13.1, a second solenoid valve 13.2, a fourth solenoid valve 13.4, a fifth solenoid valve 13.5, a sixth solenoid valve 13.6, a first check valve 14.1, a second check valve 14.2, a third check valve 14.3, a first flow meter 15.1, a second flow meter 15.2, a first pressure sensor 16.1, a second pressure sensor 16.2, a third pressure sensor 16.3, a fourth pressure sensor 16.4, a fifth pressure sensor 16.5, a sixth pressure sensor 16.6, a seventh pressure sensor 16.7, an eighth pressure sensor 16.8, a ninth pressure sensor 16.9, a tenth pressure sensor 16.10, an eleventh pressure sensor 16.11, a twelfth pressure sensor 16.12, a first temperature sensor 17.1, a second temperature sensor 17.2, a third temperature sensor 17.3, a fourth temperature sensor 17.4, a fifth temperature sensor 17.5, a sixth temperature sensor 17.6, a seventh temperature sensor 17.7, an eighth temperature sensor 17.8, a ninth temperature sensor 17.9, a tenth temperature sensor 17.10, an eleventh temperature sensor 17.11, a twelfth temperature sensor 17.12 and a door anti-freezing area 18.

Figure 3:
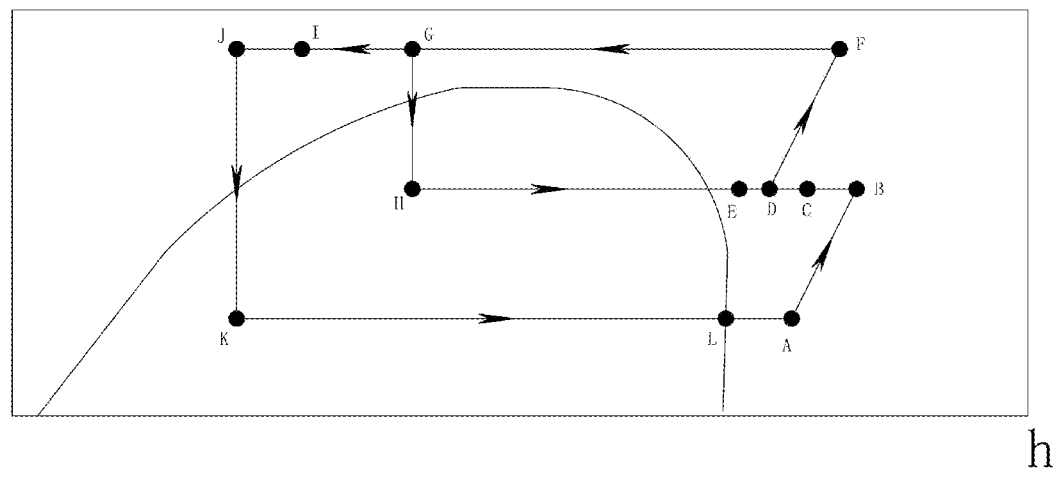
FIG. 3 is a pressure-enthalpy diagram of the main refrigeration system of the refrigerated container refrigeration system capable of preventing freezing of container door according to an embodiment of the disclosure, where A-L respectively represent different state points.

FIG. 3 is a pressure-enthalpy diagram of the main refrigeration system of a refrigerated container refrigeration system capable of preventing freezing of container door, where A-L respectively represent different state points.

The main refrigeration system is a split two-stage compression cycle refrigeration system, which is operated as follows. The low-temperature gaseous carbon dioxide flows from the outlet of the evaporator 7 and then passes through the second gas-liquid separator 6.2 to reach the low-temperature end inlet of the second regenerator 4.2 (state point L). Then the low-temperature gaseous carbon dioxide is heated by the second regenerator 4.2 and adjusted by the first suction pressure regulating valve 8.1 to reach the state point A. The carbon dioxide gas at the state point A is compressed by the low-pressure compressor 1.1 and de-oiled by the first oil separator 2.1 to arrive at the state point B, and then the carbon dioxide is sent to the inlet of the first gas cooler 3.1. The carbon dioxide gas at the state point B is cooled by the first gas cooler 3.1 and adjusted by the first gas cooler pressure regulating valve 10.1 and the first differential pressure regulating valve 11.1 to form the carbon dioxide gas at the state point C which contains a little high-pressure gas. The carbon dioxide gas at state point C is mixed with the medium-pressure carbon dioxide gas that has undergone throttling, regeneration and dehydration, and then sent to the inlet of the high-pressure compressor 1.2 (state point D). At this time, the residual flow of the high-pressure gas will be cooled by the medium-pressure carbon dioxide gas. The carbon dioxide gas is compressed for the second time by the high-pressure compressor 1.2, dehydrated by the second oil separator 2.2 and transported to the second gas cooler 3.2 (state point F). The carbon dioxide at the state point F is cooled by the second gas cooler 3.2, and adjusted by the second gas cooler pressure regulating valve 10.2 and the second differential pressure regulating valve 11.2 to reach state point G. The carbon dioxide at the state point G is divided, and one part of the carbon dioxide is throttled by the first electronic expansion valve 5.1, and then flows to the low temperature end inlet of the first regenerator 4.1 (state point H). The carbon dioxide at the state point H is heated by the first regenerator 4.1 and dehydrated by the first gas-liquid separator 6.1 to reach the state point E. The carbon dioxide gas at the state point E is mixed with the carbon dioxide gas at the state point C and then sent to the inlet of the high-pressure compressor 1.2 (state point D). The other part of carbon dioxide is cooled by the first regenerator 4.1 and sent to the high-temperature end inlet of the second regenerator 4.2 (state point I). The carbon dioxide at the state point I is cooled again by the second regenerator 4.2 to the state point J. The carbon dioxide at the state point J passes through the second electronic expansion valve 5.2, and is throttled to the state point K, and then delivered to the inlet of the evaporator 7. The carbon dioxide at the state point K enters the evaporator 7 and undergoes constant pressure endothermic evaporation to form low-temperature gaseous carbon dioxide (state point L).

The evaporating temperature of the refrigeration system is −23° C., and the temperature of the outlet of the condenser is 32° C. According to the state points shown in FIG. 3, the outlet temperature of the high-pressure compressor 1.2 is 80° C., and the corresponding pipeline is the pipeline passing through the door anti-freezing area 18. According to the anti-freezing requirements of the door, the heat dissipation temperature of the heating wire or heating equipment should be higher than or equal to 15° C., otherwise it is difficult to guarantee the long-term anti-freezing. Therefore, the temperature of the pipeline of this application can meet the requirements.

Figure 4:
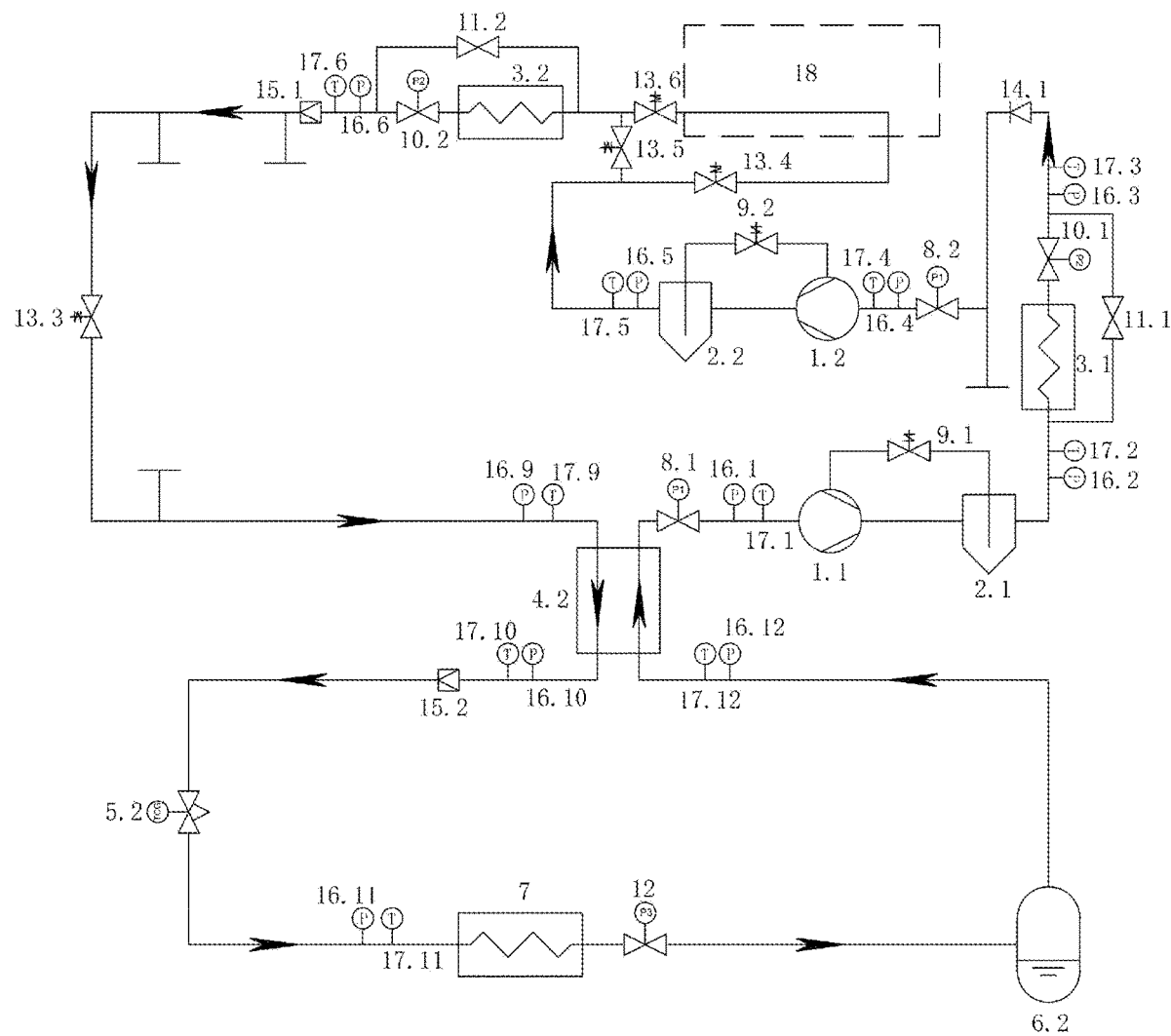
FIG. 4 is a schematic diagram of a backup refrigeration system of the refrigerated container refrigeration system capable of preventing freezing of container door according to an embodiment of the disclosure.

Referring to an embodiment shown in FIG. 4, a backup refrigeration system of the refrigerated container refrigeration system includes a low-pressure compressor 1.1, a high-pressure compressor 1.2, a first oil separation 2.1, a second oil separator 2.2, a first gas cooler 3.1, a second gas cooler 3.2, a second regenerator 4.2, a second electronic expansion valve 5.2, a second gas-liquid separator 6.2, an evaporator 7, a first suction pressure regulating valve 8.1, a second suction pressure regulating valve 8.2, a first oil level solenoid valve 9.1, a second oil level solenoid valve 9.2, a first gas cooler pressure regulating valve 10.1, a second gas cooler pressure regulating valve 10.2, a first differential pressure regulating valve 11.1, a second differential pressure regulating valve 11.2, an evaporation pressure regulating valve 12, a third solenoid valve 13.3, a fourth solenoid valve 13.4, a fifth solenoid valve 13.5, a sixth solenoid valve 13.6, a first check valve 14.1, a first flow meter 15.1, a second flow meter 15.2, a first pressure sensor 16.1, a second pressure sensor 16.2, a third pressure sensor 16.3, a fourth pressure sensor 16.4, a fifth pressure sensor 16.5, a sixth pressure sensor 16.6, a ninth pressure sensor 16.9, a tenth pressure sensor 16.10, an eleventh pressure sensor 16.11, a twelfth pressure sensor 16.12, a first temperature sensor 17.1, a second temperature sensor 17.2, a third temperature sensor 17.3, a fourth temperature sensor 17.4, a fifth temperature sensor 17.5, a sixth temperature sensor 17.6, a ninth temperature sensor 17.9, a tenth temperature sensor 17.10, an eleventh temperature sensor 17.11, a twelfth temperature sensor 17.12 and a door anti-freezing area 18.

Figure 5:
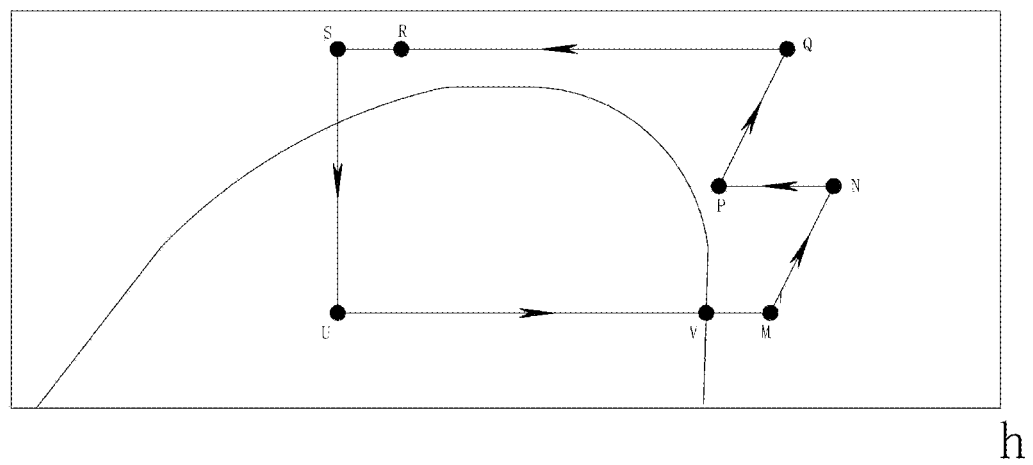
FIG. 5 is a pressure-enthalpy diagram of the backup refrigeration system of the refrigerated container refrigeration system capable of preventing freezing of container door according to an embodiment of the disclosure, where M, N, P, Q, R, S, U and V respectively represent different state points.

FIG. 5 is a pressure-enthalpy diagram of the backup refrigeration system of the refrigerated container refrigeration system provided herein, where M, N, P, Q, R, S, U and V respectively represent different state points.

The backup refrigeration system is an ordinary two-stage compression refrigeration system, which is operated as follows. The low-temperature gaseous carbon dioxide flows from the outlet of the evaporator 7 and then passes through the second gas-liquid separator 6.2 to reach the low-temperature end inlet of the second regenerator 4.2 (state point V). The low-temperature gaseous carbon dioxide is heated by the second regenerator 4.2 and adjusted by the first suction pressure regulating valve 8.1 to reach the state point M. The carbon dioxide gas at the state point M is compressed by the low-pressure compressor 1.1 and de-oiled by the first oil separator 2.1 to form the carbon dioxide at the state point N, which is then transported to the inlet of the first gas cooler 3.1. The carbon dioxide gas at the state point N is cooled by the first gas cooler 3.1 and adjusted by the first gas cooler pressure regulating valve 10.1 and the first differential pressure regulating valve 11.1 to form carbon dioxide gas at the state point P, which is then delivered to the inlet of the high-pressure compressor 1.2. The carbon dioxide gas is compressed for the second time by the high-pressure compressor 1.2, dehydrated by the second oil separator 2.2, and then transported to the second gas cooler 3.2 (state point Q). The carbon dioxide at the state point Q is cooled by the second gas cooler 3.2, and adjusted by the second gas cooler pressure regulating valve 10.2 and the second differential pressure regulating valve 11.2 to reach the state point R, and then the carbon dioxide is transported to the high-temperature end inlet of the second regenerator 4.2. The carbon dioxide at the state point R is cooled again by the second regenerator 4.2 to the state point S. The carbon dioxide at the state point S passes through the second electronic expansion valve 5.2 and is throttled to the state point U, and delivered to the inlet of the evaporator 7. The carbon dioxide at the state point U undergoes constant pressure endothermic evaporation in the evaporator 7 to form low-temperature gaseous carbon dioxide (state point V).

The COP value of the ordinary two-stage compression refrigeration system using carbon dioxide as the refrigerant is lower than that of a split two-stage compression cycle refrigeration system. Specifically, the maximum area enclosed by the state points in FIG. 3 is larger than that enclosed by the state points in FIG. 5, so the split two-stage compression cycle refrigeration system is used under normal circumstances. In this case, the first solenoid valve 13.1 and the second solenoid valve 13.2 are switched on, and the third solenoid valve 13.3 is switched off. However, the system has relatively complicated pipeline arrangement, and it is difficult to quickly replace the failed pipeline. If only the pipeline damage occurs, the first solenoid valve 13.1 and the second solenoid valve 13.2 can be switched off and the third solenoid valve 13.3 can be switched on to start the backup refrigeration system.

Figure 6:
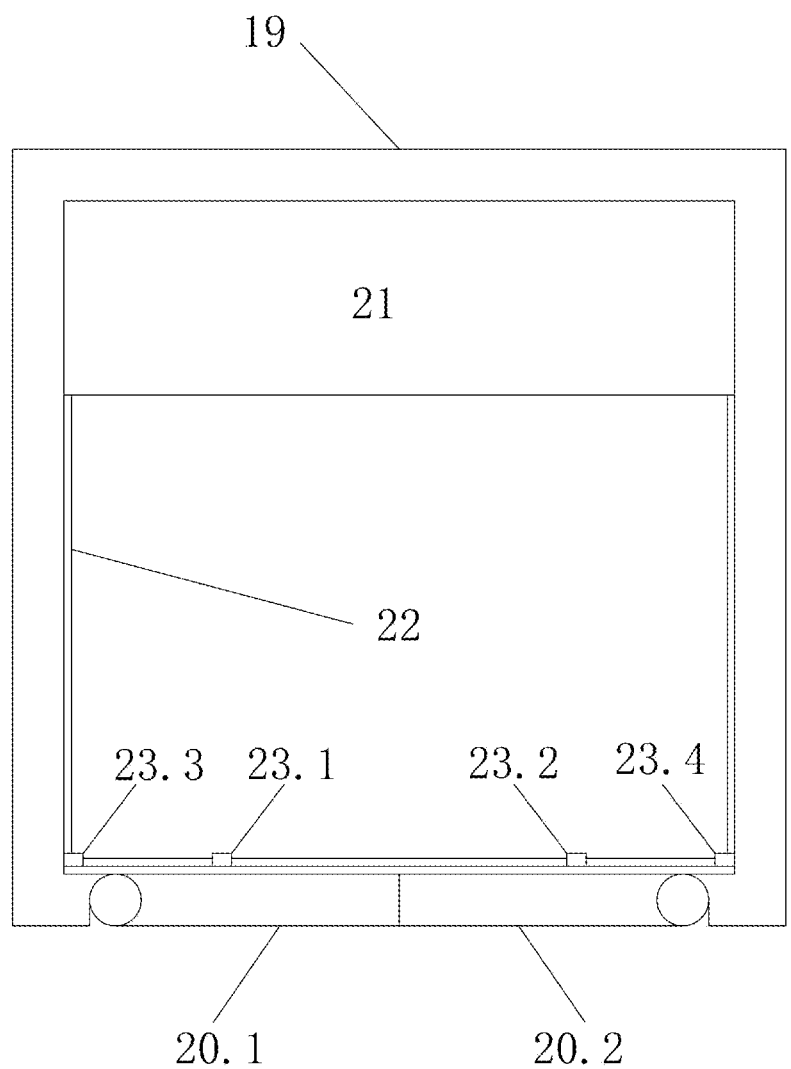
FIG. 6 is a sectional view of a refrigerated container of the refrigerated container refrigeration system capable of preventing freezing of container door according to an embodiment of the disclosure from a top perspective.

FIG. 6 is a sectional view of a refrigerated container of the refrigerated container refrigeration system capable of preventing freezing of container door from a top perspective, in which a refrigerated container shell 19, a first refrigerated container door 20.1, a second refrigerated container door 20.2, a refrigeration unit 21, an anti-freezing pipeline 22, a first fastening component 23.1, a second fastening component 23.2, a third fastening component 23.3 and a fourth fastening component 23.4 are presented.

Figure 7:
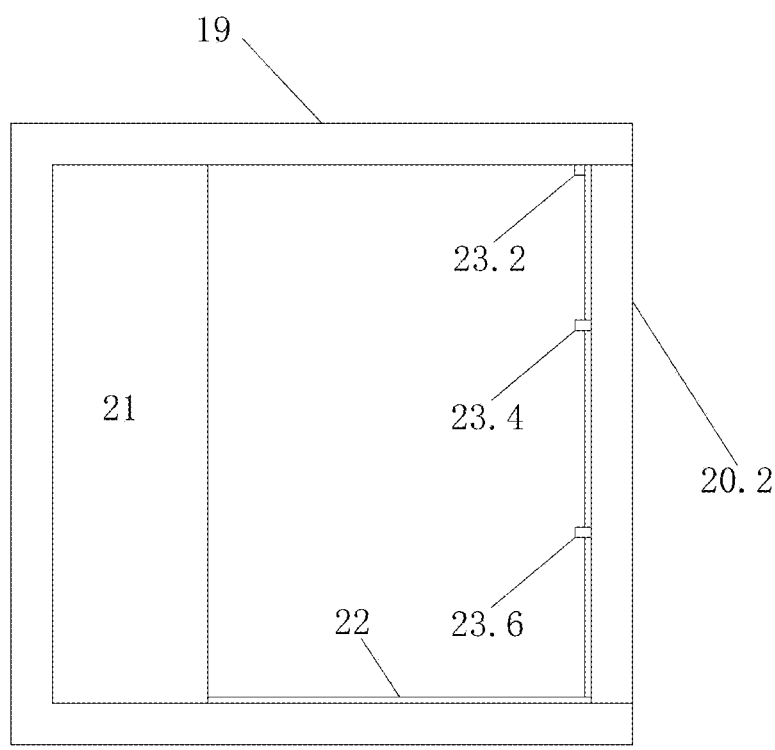
FIG. 7 is a sectional view of the refrigerated container of the refrigerated container refrigeration system according to an embodiment of the disclosure from a left side perspective.

FIG. 7 is a sectional view of the refrigerated container of the refrigerated container refrigeration system from a left side perspective, in which a refrigerated container shell 19, a second refrigerated container door 20.2, a refrigeration unit 21, an anti-freezing pipeline 22, a second fastening component 23.2, a fourth fastening component 23.4 and a sixth fastening component 23.6 are presented.

Figure 8:
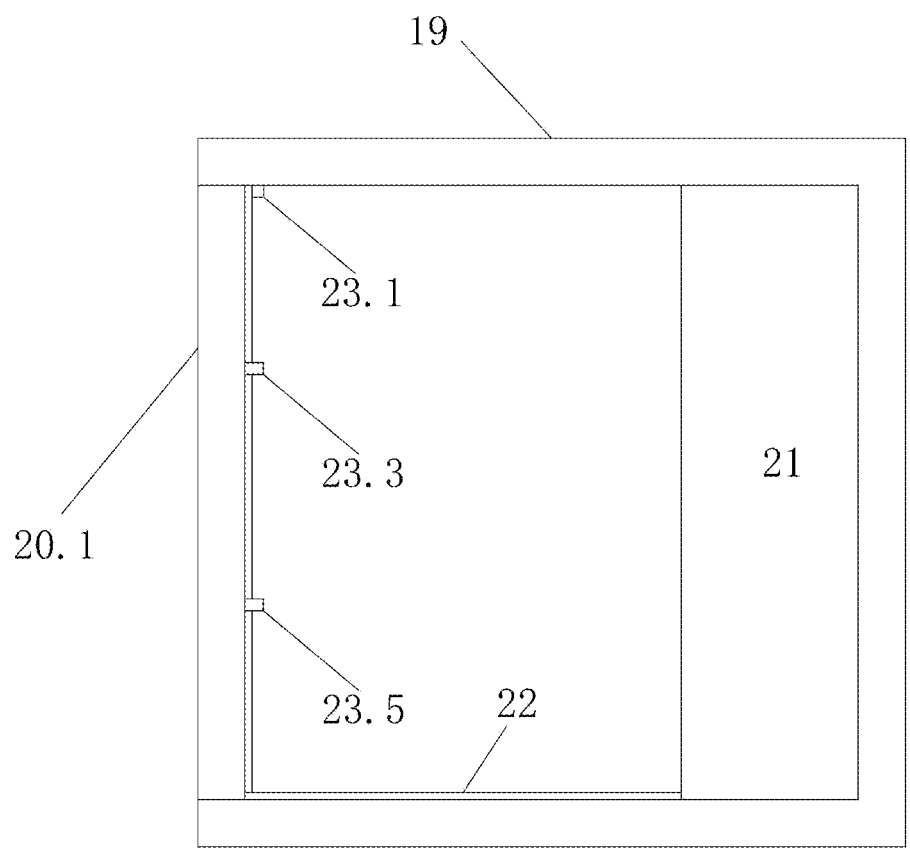
FIG. 8 is a sectional view of the refrigerated container of the refrigerated container refrigeration system according to an embodiment of the disclosure from a right side perspective.

FIG. 8 is a sectional view of the refrigerated container of the refrigerated container refrigeration system from a right side perspective, in which a refrigerated container shell 19, a first refrigerated container door 20.1, a refrigeration unit 21, an anti-freezing pipeline 22, a first fastening component 23.1, a third fastening component 23.3 and a fifth fastening component 23.5 are presented.

Figure 9:
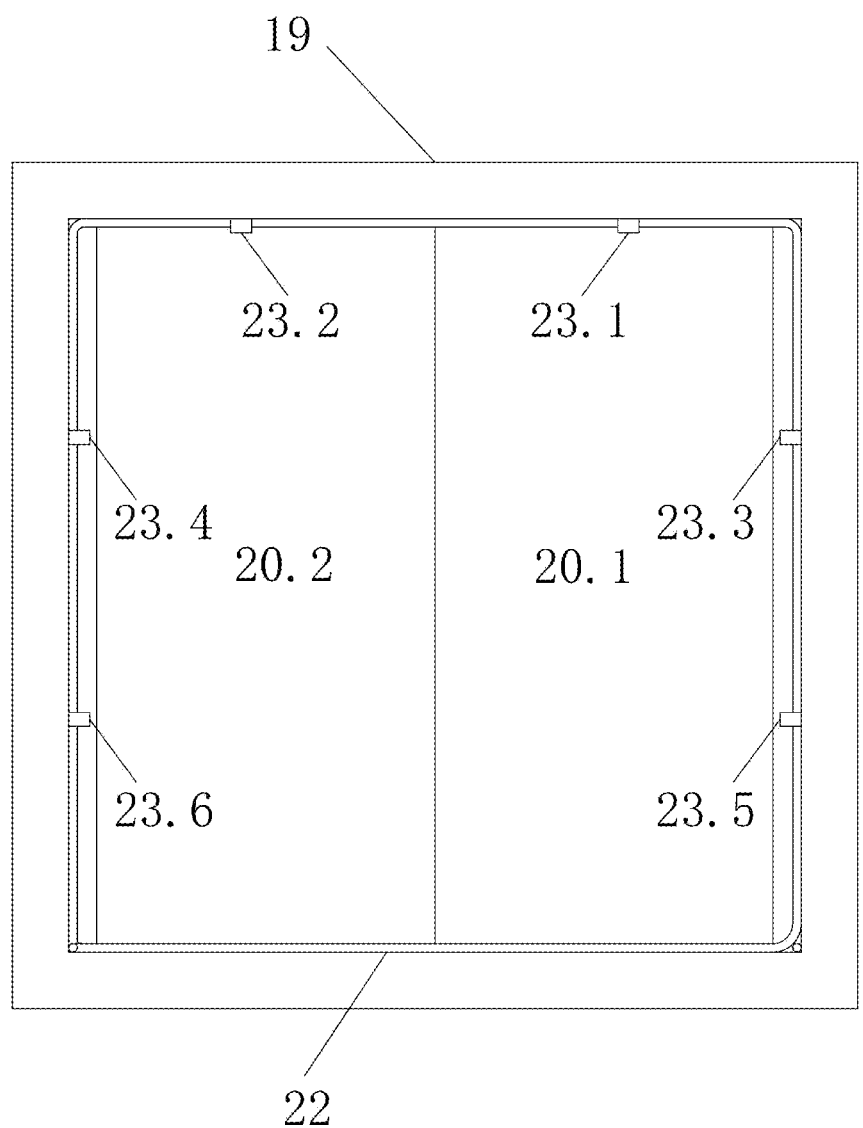
FIG. 9 is a sectional view of the refrigerated container of the refrigerated container refrigeration system according to an embodiment of the disclosure from a rear perspective.

FIG. 9 is a sectional view of the refrigerated container of the refrigerated container refrigeration system from a rear perspective, in which a refrigerated container shell 19, a first refrigerated container door 20.1, a second refrigerated container door 20.2, an anti-freezing pipeline 22, a first fastening component 23.1, a second fastening component 23.2, a third fastening component 23.3, a fourth fastening component 23.4, a fifth fastening component 23.5 and a sixth fastening component 23.6 are presented.

The anti-freezing pipeline 22 extends from the refrigerating unit 21 along the inner edge of the refrigerated container shell 19, and is arranged on a surface where the first refrigerated container door 20.1 and the second refrigerated container door 20.2 located along the inner edge of the refrigerated container shell 19. The anti-freezing pipeline 22 clockwise around the first refrigerated container door 20.1 and the second refrigerated container door 20.2, and then connect back to the refrigerating unit 21 along the inner edge of the refrigerated container shell.

The refrigerated container shell 19 has a size of 1.2×1.2× 1.2 m, and a wall thickness of 80 mm. The refrigerated container shell has a three-layer structure. An outer layer and an inner layer of the refrigerated container shell are made of stainless steel with a thermal conductivity of 15 W/(m²K). A middle layer of the refrigerated container shell is an insulation layer, which is a vacuum insulation board with a thickness of 78 mm with a thermal conductivity of 0.008 W/(m²·K). A mechanical refrigeration method is adopted in this application, so that the heat transfer coefficient of the inner layer stainless steel is selected as 29.075 W; the heat transfer coefficient of the outer layer stainless steel is selected as 23.200 W; and the total heat transfer coefficient of the refrigerated container shell 19 is calculated to be 0.102 W/(m²K). For comparison, the total heat transfer coefficients of the refrigerated container shells in some literatures are listed as follows: 0.246 W/(m²·K) (Xue W. The Design of a Refrigeration Unit for Marine Reefer Container and its Performance Research. JiMei University 2013), 0.23 W/(m²·K) (Li M C. Performance of the Radiant Cooling System on the Roof of LNG-fueled Refrigerated Vehicles. Zhongyuan University of Technology 2019), 0.3 W/(m²·K) (Guo Y G. Research on Temperature Field Distribution of Cold Plate Refrigerated Truck and Effects on Preservation of Vegetables. Tianjin University of Commerce 2014), 0.35 W/(m²·K) (Zhao X X. Multi-temperature Distribution Optimization and Precise Temperature Regulation of Refrigerated Truck. Shandong University 2014) and 0.35 W/(m²·K) (Han F F. Simulation research on the cold storage LNG refrigerated truck with multi-temperature zone. North China Electric Power University (Beijing) 2018). It can be found that the total heat transfer coefficient of the refrigerated container shell 19 of this application is only 44.35% of the lowest value of the above-listed values, indicating extremely strong heat-preservation performance of the refrigerated container shell provided herein. As a consequence, the shell can effectively prevent the loss of cold air, thereby reducing unnecessary energy consumption of the refrigeration unit.

The first refrigerated container door 20.1 and the second refrigerated container door 20.2 are arranged on a front side of the refrigerated container shell 19, which have a height of 1.04 m, a width of 0.48 m and a thickness of 0.08 m, respectively. The first refrigerated container door 20.1 and the second refrigerated container door 20.2 are 0.12 m from both sides of the refrigerated container shell 19, and of which the outer side is parallel to the front side of the refrigerated container shell 19.

The refrigeration unit 21 is arranged inside the refrigerated container shell 19, which is close to the rear side of the refrigerated container shell 19. The refrigeration unit 21 occupies an area of 1.04×1.04×0.3 m, and all refrigeration units except the anti-freezing pipeline 22 are arranged in this area.

The anti-freezing pipeline 22 has an inner diameter of 10 mm and a thickness of 1 mm, and is arranged close to the edge of the inner side of the refrigerated container shell 19. The anti-freezing pipeline 22 is arranged around the first refrigerated container door 20.1 and the second refrigerated container door 20.2. The parts of the anti-freezing pipeline 22 configured to prevent tops of the first refrigerated container door 20.1 and the second refrigerated container door 20.2 from being frozen are arranged close to the top of the inside of the refrigerated container shell 19. The parts of the anti-freezing pipeline 22 configured to prevent the left side and the right side of the first refrigerated container door 20.1 and the second refrigerated container door 20.2 from being frozen are respectively arranged 28 mm away from the right side of the first refrigerated container door 20.1 and 28 mm away from the left side of the second refrigerated container door 20.2. The parts of the anti-freezing pipeline 22 configured to prevent the bottom of the first refrigerated container door 20.1 and the second refrigerated container door 20.2 from being frozen are arranged close to the bottom of the inside of the refrigerated container shell 19, and the distance from the anti-freezing pipeline 22 to the first refrigerated container door 20.1 and the second refrigerated container door 20.2 should not exceed 30 mm.

The anti-freezing pipeline 22 arranged around the first refrigerated container door 20.1 and the second refrigerated container door 20.2 are fixed by the first fastening component 23.1, the second fastening component 23.2, the third fastening component 23.3, the fourth fastening component 23.4, the fifth fastening component 23.5 and the sixth fastening component 23.6. The first fastening component 23.1, the second fastening component 23.2, the third fastening component 23.3, the fourth fastening component 23.4, the fifth fastening component 23.5 and the sixth fastening component 23.6 are both have a size of 30×30×20 mm, and in which a hollowed-out size of 25×25×15 mm is arranged respectively for the passage of the anti-freezing pipeline 22. The first fastening component 23.1 and the second fastening component 23.2 are arranged on the top of the inner side of the refrigerated container shell 19, and is 2 mm away from the first refrigerated container door 20.1 or the second refrigerated container door 20.2 and 230 mm away from the inner left side or inner right side of the refrigerated container shell 19 close to itself. The third fastening component 23.3 and the fifth fastening component 23.5 are arranged on the left side of the inner side of the refrigerated container shell 19, and both 12 mm away from the inner front side of the refrigerated container shell 19. The third fastening component 23.3 is 720 mm away from the bottom of the inner side of the refrigerated container shell 19. The fifth fastening component 23.5 is 320 mm away from the bottom of the inner side of the refrigerated container shell 19. The fourth fastening component 23.4 and the sixth fastening component 23.6 are arranged on the right side of the inner side of the refrigerated container shell 19, and all 12 mm away from the front side of the inner side of the refrigerated container shell 19. The fourth fastening component 23.4 is 720 mm away from the bottom of the inner side of the refrigerated container shell 19. The sixth fastening component 23.6 is 320 mm away from the bottom of the inner side of the refrigerated container shell 19.

The first fastening component 23.1, the second fastening component 23.2, the third fastening component 23.3, the fourth fastening component 23.4, the fifth fastening component 23.5, and the sixth fastening component 23.6 are configured to fix the anti-freezing pipeline 22, and are made of stainless steel.

When the refrigeration system is operated, the high-temperature carbon dioxide at the outlet of the high-pressure compressor 1.2 will pass through the anti-freezing pipeline 22. At this time, the temperature of the carbon dioxide is 80° C., which is much higher than 15° C. The carbon dioxide can perform long-term anti-freezing treatment on the first refrigerated container door 20.1 or the second refrigerated container door 20.2.

The anti-freezing pipeline 22 is arranged along the edge of the refrigerated container shell 19, which can be far away from the stacked goods without affecting the surrounding low-temperature environment.

If there is a problem with the antifreeze pipeline 22, the fifth solenoid valve 13.5 is immediately open, and the fourth solenoid valve 13.4 and the sixth solenoid valve 13.6 are closed, ensuring that the refrigeration system can continue to operate normally.

10-20 cm of the anti-freezing pipeline 22 is reserved as an elastic margin, and the anti-freezing pipeline 22 is not tightened or straightened to prevent the pipeline from being broken due to excessive stress.

Described above are only the preferred embodiments of the present disclosure, and are not intended to limit the scope of the present disclosure. Any changes, modifications and improvements made by those skilled in the art without departing from the spirit of the present disclosure shall fall within the scope of the present disclosure defined by the appended claims.

What is claimed is:

1. A refrigerated container refrigeration system capable of preventing freezing of a container door, comprising:
    compressors;
    oil separators;
    gas coolers;
    regenerators;
    electronic expansion valves;
    gas-liquid separators;
    an evaporator;
    suction pressure regulating valves;
    oil level solenoid valves;
    gas cooler pressure regulating valves;
    differential pressure regulating valves;
    an evaporation pressure regulating valve;
    solenoid valves;
    check valves;
    flow meters;
    pressure sensors;
    temperature sensors;
    a door anti-freezing area;
    a refrigerated container shell;
    refrigerated container doors;
    a refrigeration unit;
    an anti-freezing pipeline; and
    fastening components;
    wherein the compressors comprise a low-pressure compressor and a high-pressure compressor;
    the oil separators comprise a first oil separator and a second oil separator;
    the gas coolers comprise a first gas cooler and a second gas cooler;
    the regenerators comprise a first regenerator and a second regenerator;
    the electronic expansion valves comprise a first electronic expansion valve and a second electronic expansion valve;
    the gas-liquid separators comprise a first gas-liquid separator and a second gas-liquid separator;
    the suction pressure regulating valves comprise a first suction pressure regulating valve and a second suction pressure regulating valve;
    the oil level solenoid valves comprise a first oil level solenoid valve and a second oil level solenoid valve;
    the gas cooler pressure regulating valves comprise a first gas cooler pressure regulating valve and a second gas cooler pressure regulating valve;
    the differential pressure regulating valves comprise a first differential pressure regulating valve and a second differential pressure regulating valve;
    the solenoid valves comprise a first solenoid valve, a second solenoid valve, a third solenoid valve, a fourth solenoid valve, a fifth solenoid valve and a sixth solenoid valve;
    the check valves comprise a first check valve, a second check valve and a third check valve;
    the flow meters comprise a first flow meter and a second flow meter;
    the pressure sensors comprise a first pressure sensor, a second pressure sensor, a third pressure sensor, a fourth pressure sensor, a fifth pressure sensor, a sixth pressure sensor, a seventh pressure sensor, an eighth pressure sensor, a ninth pressure sensor, a tenth pressure sensor, an eleventh pressure sensor and a twelfth pressure sensor;
    the temperature sensors comprise a first temperature sensor, a second temperature sensor, a third temperature sensor, a fourth temperature sensor, a fifth temperature sensor, and a sixth temperature sensor, a seventh temperature sensor, an eighth temperature sensor, a ninth temperature sensor, a tenth temperature sensor, an eleventh temperature sensor and a twelfth temperature sensor;
    the refrigerated container doors comprise a first refrigerated container door and a second refrigerated container door;
    the fastening components comprise a first fastening component, a second fastening component, a third fastening component, a fourth fastening component, and a fifth fastening component and a sixth fastening component;
    an outlet of the low-pressure compressor is connected to the first oil separator;
    a gas outlet of the first oil separator is connected to an inlet of the first gas cooler;
    pipelines of an outlet of the first gas cooler and an outlet of the first gas-liquid separator converge and are connected to an inlet of the high-pressure compressor together;
    an outlet of the high-pressure compressor is connected to the second oil separator;
    a pipeline of a gas outlet of the second oil separator passes through the door anti-freezing area, and is connected to an inlet of the second gas cooler; a pipeline that does not pass through the door anti-freezing area is provided in parallel in the pipeline of the gas outlet of the second oil separator;
    a pipeline of an outlet of the second gas cooler is divided into a first branch pipeline and a second branch pipeline, which are connected to a low-temperature end inlet and a high-temperature end inlet of the first regenerator, respectively; the first branch pipeline is connected to the first electronic expansion valve, and then connected to the low-temperature end inlet of the first regenerator; the second branch pipeline is directly connected to the high temperature end inlet of the first regenerator;
    the first branch pipeline passes through the first regenerator and is connected to the first gas-liquid separator; the second branch pipeline passes through the first regenerator and is connected to a high-temperature end inlet of the second regenerator; a pipeline connected to the high-temperature end inlet of the second regenerator without passing through the first regenerator is provided beside the second branch pipeline and in parallel with the second branch pipeline;
a low-temperature end outlet of the second regenerator is connected to the second electronic expansion valve;
the second electronic expansion valve is connected to an inlet of the evaporator;
an outlet of the evaporator is connected to the second gas-liquid separator;
a gas outlet of the second gas-liquid separator is connected to a low-temperature end inlet of the second regenerator;
a high-temperature end outlet of the second regenerator is connected to the low-pressure compressor;
the first suction pressure regulating valve and the second suction pressure regulating valve are arranged upstream of the low-pressure compressor and the high-pressure compressor, respectively;
a first parallel pipeline is connected between the first oil separator and the low-pressure compressor; a second parallel pipeline is connected between the second oil separator and the high-pressure compressor; the first oil level solenoid valve and the second oil level solenoid valve are respectively arranged on the first and second parallel pipelines;
the first gas cooler pressure regulating valve and the second gas cooler pressure regulating valve are respectively arranged downstream of the first gas cooler and the second gas cooler; and a third parallel pipeline is arranged with an inlet upstream the first gas cooler and an outlet downstream the first gas cooler pressure regulating valve; a fourth parallel pipeline is arranged with an inlet upstream the second gas cooler and an outlet downstream the second gas cooler pressure regulating valve; the first differential pressure regulating valve and the second differential pressure regulating valve are arranged on the third parallel pipeline and the fourth parallel pipeline, respectively;
the solenoid valves are configured for pipeline switching;
the check valves are configured to prevent pipeline refilling;
the evaporation pressure regulating valve is arranged at the outlet of the evaporator;
the first flow meter and the second flow meter are respectively arranged at the outlet of the second gas cooler and the low-temperature end outlet of the second regenerator;
the first pressure sensor and the first temperature sensor constitute a first temperature-pressure monitoring group;
the second pressure sensor and the second temperature sensor constitute a second temperature-pressure monitoring group;
the third pressure sensor and the third temperature sensor constitute a third temperature-pressure monitoring group;
the fourth pressure sensor and the fourth temperature sensor constitute a fourth temperature-pressure monitoring group;
the fifth pressure sensor and the fifth temperature sensor constitute a fifth temperature-pressure monitoring group;
the sixth pressure sensor and the sixth temperature sensor constitute a sixth temperature-pressure monitoring group;
the seventh pressure sensor and the seventh temperature sensor constitute a seventh temperature-pressure monitoring group;
the eighth pressure sensor and the eighth temperature sensor constitute an eighth temperature-pressure monitoring group;
the ninth pressure sensor and the ninth temperature sensor constitute a ninth temperature-pressure monitoring group;
the tenth pressure sensor and the tenth temperature sensor constitute a tenth temperature-pressure monitoring group;
the eleventh pressure sensor and the eleventh temperature sensor constitute an eleventh temperature-pressure monitoring group;
the twelfth pressure sensor and the twelfth temperature sensor constitute a twelfth temperature-pressure monitoring group;
the first temperature-pressure monitoring group is provided at the pipeline upstream of the low-pressure compressor and is provided between the low-pressure compressor and the first suction pressure regulating valve; the second temperature-pressure monitoring group is provided at a pipeline connected between the first oil separator and the first gas cooler; the third temperature-pressure monitoring group is provided at a pipeline connected between the first gas cooler pressure regulating valve and the first check valve; the fourth temperature-pressure monitoring group is provided at the pipeline upstream of the high-pressure compressor and is provided between the high-pressure compressor and the second suction pressure regulating valve; the fifth temperature-pressure monitoring group is provided at a pipeline connected between the second oil separator and the fifth solenoid valve; the sixth temperature-pressure monitoring group is provided at a pipeline connected between the second gas cooler pressure regulating valve and the first flow meter; the seventh temperature-pressure monitoring group is provided at a pipeline connected between the first electronic expansion valve and the low-temperature end inlet of the first regenerator; the eighth temperature-pressure monitoring group is provided at a pipeline connected between the first gas-liquid separator and the second check valve; the ninth temperature-pressure monitoring group is provided at a pipeline upstream of the high-temperature end inlet of the second regenerator; the tenth temperature-pressure monitoring group is provided at a pipeline connected between the low-temperature end outlet of the second regenerator and the second flow meter; the eleventh temperature-pressure monitoring group is provided at a pipeline connected between the second electronic expansion valve and the inlet of the evaporator; the twelfth temperature-pressure monitoring group is provided at a pipeline connected between the gas outlet of the second gas-liquid separator and the low-temperature end inlet of the second regenerator;
the anti-freezing pipeline is arranged along an inner edge of the refrigerated container shell; and
the first fastening component, the second fastening component, the third fastening component, the fourth fastening component, the fifth fastening component and the sixth fastening component are configured to fix the anti-freezing pipeline.

2. The refrigerated container refrigeration system of claim 1, wherein a refrigerant of the refrigeration system is carbon dioxide.

3. The refrigerated container refrigeration system of claim 1, wherein the refrigeration system is a refrigeration system with a switchable operation pipeline, and is configured to be switched between a split two-stage compression cycle refrigeration system and an ordinary two-stage compression refrigeration circulation.

4. The refrigerated container refrigeration system of claim 1, wherein the solenoid valve of the refrigeration system is switched on and off according to a preset condition; when a main refrigeration system is operated, the first solenoid valve and the second solenoid valve are switched on, and the third solenoid valve is switched off; when a backup refrigeration system is required to be operated, the first solenoid valve and the second solenoid valve are switched off, and the third solenoid valve is switched on; when a pipeline in the door anti-freezing area is in a normal state, the fourth solenoid valve and the sixth solenoid valve are switched on, and the fifth solenoid valve is switched off; when the pipeline in the door anti-freezing area is in a fault state, the fourth solenoid valve and the sixth solenoid valve are switched off, and the fifth solenoid valve is switched on.

5. The refrigerated container refrigeration system of claim 1, wherein the refrigerated container shell has a three-layer structure; an outer layer and an inner layer of the refrigerated container shell are made of stainless steel, and a middle layer of the refrigerated container shell is an insulation layer made of a vacuum insulation board or a polyurethane board.

6. The refrigerated container refrigeration system of claim 1, wherein 10-20 cm of the anti-freezing pipeline is reserved as an elastic margin.

7. The refrigerated container refrigeration system of claim 1, wherein the fastening components are made of stainless steel.

* * * * *